E. F. BROWNING.
EDUCATIONAL AND AMUSEMENT DEVICE.
APPLICATION FILED FEB. 6, 1914.

1,120,681.

Patented Dec. 15, 1914.

2 SHEETS—SHEET 1.

The
Begins with letter C
Wreathed in green,
but not a tree.

The
Begins with letter C
Wreathed in green,
but not a tree.

Witnesses:

Edna F. Browning, Inventor
By her Attorney John D. Morgan

E. F. BROWNING.
EDUCATIONAL AND AMUSEMENT DEVICE.
APPLICATION FILED FEB. 6, 1914.
1,120,681.
Patented Dec. 15, 1914.
2 SHEETS—SHEET 2.
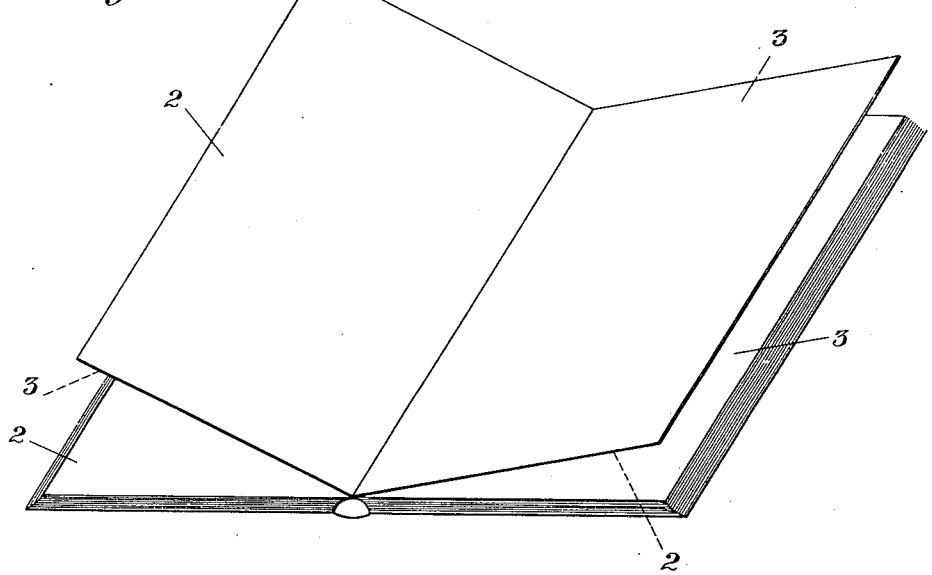
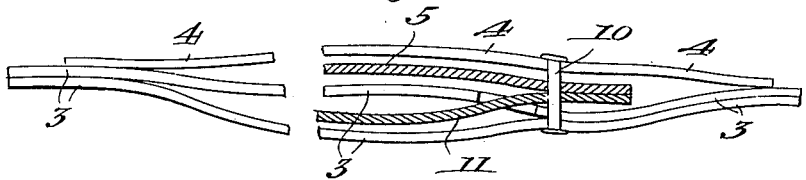

UNITED STATES PATENT OFFICE.

EDNA F. BROWNING, OF NEW YORK, N. Y.

EDUCATIONAL AND AMUSEMENT DEVICE.

1,120,681.  Specification of Letters Patent.  Patented Dec. 15, 1914.

Application filed February 6, 1914. Serial No. 816,892.

*To all whom it may concern:*

Be it known that I, EDNA F. BROWNING, a citizen of the United States, and a resident of New York, in the county and State of New York, have invented certain new and useful Improvements in Educational and Amusement Devices, of which the following is a specification.

The invention relates to educational and amusement devices and especially to such devices designed and adapted for the instruction and entertainment of children.

The objects and purposes of the invention will be set forth hereinafter in part, and in part will be obvious, said objects being attained and realized by the means and instrumentalities pointed out in the appended claims.

The invention consists in the novel parts, arrangements, constructions, combinations and improvements herein shown and described.

The accompanying drawings, referred to herein and forming a part hereof, illustrate one embodiment of the invention, and taken together with the description serve to explain the principles of the invention.

Figure 1:
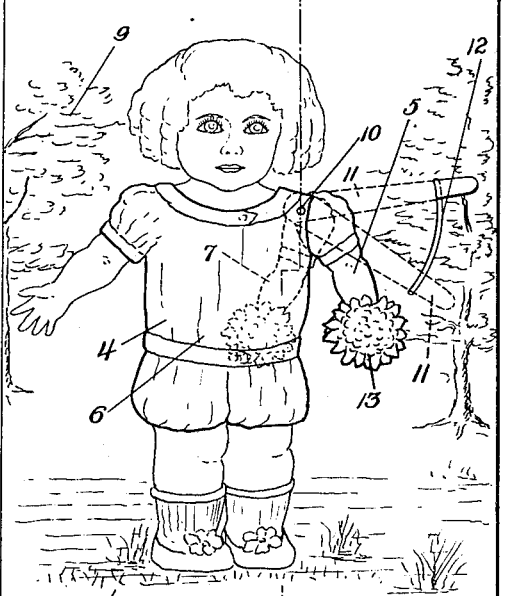
Figure 2:
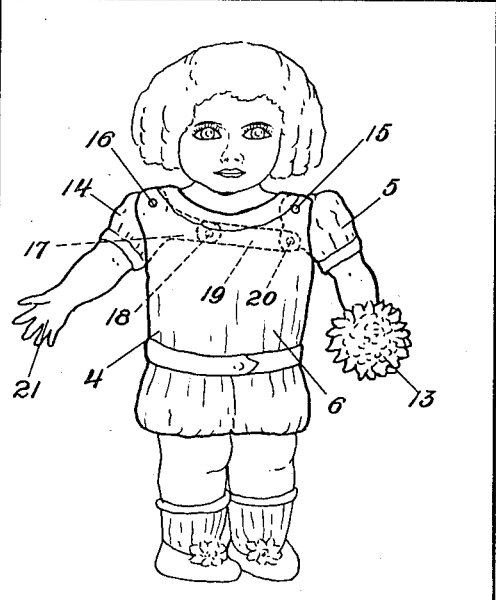

Of the drawings: Figure 1 is a plan of a card or open book embodying the invention; Fig. 2 is a view similar to Fig. 1, but showing a different form of moving means for the arms of the figure; Fig. 3 is a perspective view of a book embodying the invention; and Fig. 4 is a section on the line A—B of Fig. 1.

Referring in detail to the accompanying drawings, which illustrate by way of example an embodiment of the invention, a carrier or support 1 is provided, preferably in the form of a card or comprising the two facing pages of a book, that is, the two pages which are simultaneously in view when the book is open. The carrier 1 is divided into two parts indicated respectively by reference numerals 2 and 3. In the case of a book, the part 2 would be a page of the book, and the part 3 the next or facing page.

Upon the carrier 1 and on the two parts thereof, respectively, are represented on the one part an incomplete idea, as a legend from which a word has been omitted, and on the other part a representation of an animate figure. Behind the figure is concealed a representation completing the incomplete idea, such representation being for example, either the omitted word itself, or a pictorial representation of the object for which the word stands, or both together. Said picture or word (or word and picture) is alternatively concealed or disclosed by the movement of the figure or some member or portion thereof. With respect to the legend, I regard it as preferable also that such legend be a descriptive statement of the article concealed behind the figure, and that the omitted word be the noun or name of the article. I also prefer to have the legend, or the like, and the representation of the figure simultaneously visible.

As exemplified, the figure 4 is carried upon the part 3 of the carrier 1, and represents a little child, although so far as concerns many features of the invention, other figures might be used with or instead of the figure of the child. As embodied, the left arm 5 of the figure 4 is movable into or from the position beside the body 6, in which position a picture or word, or like representation, borne in the hand of the figure would be visible, into or from a position (shown in dotted line at 7) behind the body 6 of the figure in which dotted line position the picture or word, or like representation, held in the hand of the arm 5 would be concealed from view behind the body 6.

About the figure 4 may be arranged a background in harmony with the legend 8, which legend is carried upon the opposite or complementary part or page 2. The background 9 may, if desired, be such as to aid or assist in suggesting pictorially the idea left incomplete by the omission of a word or words from the legend 8, which idea is completed to the mind by the disclosure to view of the object or word, or like representation, concealed behind the figure 4.

Means are provided whereby the concealed picture or other representation may be moved into view and again into concealment at will. In Fig. 1 of the drawings the body 4 has the central portion thereof separate from its supporting member, such as a sheet or card 3, and may be conveniently attached thereto at either end. The upper portion of the arm 5 projects inwardly between the body 4 and the sheet 3 and is secured by a pivot 10. The sheet 3 in this form is duplicate, and between the plies of the sheet 3 is a lever 11, fastened to the shoulder or inner end of the arm 5 through a slot in the upper ply of the sheet or support 3. The sheet or support 3 has said upper ply slotted, as shown at 12, through which slot the end of the lever 11 projects. Thus when the lever 11 is moved to the upper end of the slot 12 in Fig. 1, the arm 5 bearing the picture or other symbol 13 is moved out to the full line or exposed position shown in Fig. 1 disclosing the representation held in the hand, and when the lever 11 and therewith the arm 5 is moved to the dotted line position in Fig. 1, the object or picture or other representation held thereby is thus concealed behind the body 6 of the figure 4.

In Fig. 2 of the drawings, both arms of the figure 4 are movable, the arm 5, which carries the representation of the word or object, being movable into the positions of either exposure or concealment behind the figure substantially in the manner shown in Fig. 1, the arm 14 being movable from alongside the figure to a more elevated position to so move or actuate the arm 5. In this form, the shoulder or upper end of the arm 5 extends beneath the body 6, the body at this point being separate or spaced away from the sheet or carrier 3. The arm is secured to the body by a pivot 15. The upper or shoulder end of the arm 14 extends beneath the body 6 in a similar manner, and is pivotally secured at 16. The arm 14 is provided with a short extension 17. Said extension 17 is pivotally connected at 18 to a link 19, which link is pivotally connected at 20 to the shoulder of the arm 5 in position to constitute a leverage about pivot 15. Thus, when the hand 21 of arm 14 is moved up and down, there is a corresponding movement of the arm 5 and corresponding successive disclosures and concealments of the representation 13. With this arrangement there is added interest and amusement by reason of a child when using the device taking hold of the hand of the figure 4, and movement of one part of the figure 4 producing a very lifelike movement of another part similarly to a child moving both hands together. With this form also duplication of the support 3 is unnecessary. It will be understood that the foregoing forms are by way of explanation and not in limitation of the actual embodiment of the invention.

In Fig. 3 the invention is shown embodied in a book, the pages of which are arranged so that successive turnings thereof present simultaneously to view a legend and its complementary picture, and such legend and picture are always presented to view simultaneously. The numerals 2 and 3 used in Figs. 1 and 2 are applied to Fig. 3 in a manner to make the foregoing arrangement clear without further explanation.

It will be understood that for purposes of instruction and amusement the interest of a child is greatly stimulated both by arousing the curiosity of the child through the inquiry raised by the legend, and through the manner in which the supplementary information is concealed and disclosed, the holding of the hand behind the figure to conceal an object and moving it to bring the object into view being almost an instinctive and universal habit or practice of childhood. Other objects and advantages of the invention will be clear without further explanation.

It will be understood that variations from the illustrated and described embodiment may be made, within the scope of the appended claims, without departing from the principles of the invention and without sacrificing its chief advantages.

What I claim as my invention and desire to secure by Letters Patent is:—

1. An educational and amusement device including in combination a support carrying a legend with a word or phrase omitted therefrom, and carrying a representation of an animate figure, said figure having a movable member bearing a representation of said omitted word or phrase and by its movement alternatively exposing to view said representation or concealing it from view behind said figure, and means for moving said member to so expose and conceal said representation.

2. An educational and amusement device including in combination a support carrying a legend with a word or phrase omitted therefrom, and carrying a representation of an animate figure, said figure having a movable member bearing a representation of said omitted word or phrase and by its movement alternatively exposing to view said representation or concealing it from view behind said figure, and means for moving said member to so expose and conceal said representation, said moving means comprising a part of said figure.

3. An educational and amusement device including in combination a support carrying a legend with a word or phrase omitted therefrom and carrying a representation of an animate figure, said figure having a movable member bearing a representation of said omitted word or phrase and by its movement alternatively exposing to view said representation or concealing it from view behind said figure, and means for moving said member to so expose or conceal said representation, said legend and figure being arranged upon said support so as to be simultaneously visible.

4. An educational and amusement device including in combination a support having an incomplete representation of an idea, a representation of a figure, said figure having a movable member bearing a representation completing said idea, and by its movement alternately exposing to view and concealing from view said completing representation and means for so moving said member.

5. An educational and amusement device including in combination a support having an incomplete representation of an idea, a representation of an animate figure, said figure having a movable member bearing a representation completing said idea, and by its movement alternatively exposing to view and concealing from view behind said figure said completing representation and means for so moving said member.

6. An educational and amusement device including in combination a support having an incomplete representation of an idea, a simultaneously visible representation of an animate figure said figure having a movable member bearing a representation completing said idea, and by its movement alternately exposing to view and concealing from view behind said figure and between said figure and the support said completing representation and means for so moving said member.

7. An educational and amusement device including in combination a support having an incomplete representation of an idea, a representation of a figure, said figure having a plurality of its members movable, one movable member bearing a representation completing said idea, another movable member being connected to said first mentioned movable member to cause said first movable member alternatively to expose to view or to conceal from view, said completing representation.

8. An educational and amusement device including in combination a support having an incomplete representation of an idea, a representation of an animate figure, said figure having a plurality of its members movable, one movable member bearing a representation completing said idea, another movable member being connected to said first mentioned movable member to cause said first movable member alternatively to expose to view or to conceal from view behind said figure said completing representation.

9. A book having arranged upon its leaves successive sets of representations, one representation in a particular set being an incomplete idea and the other representation in said set being that of an animate figure having a movable member bearing a graphic symbol completing said idea, both representations in a particular set being visible simultaneously when the book is open, and means for alternatively moving said member to expose said completing symbol to view or to conceal it from view.

10. A book having arranged upon its leaves successive sets of representations, one representation in a particular set being an incomplete idea and the other representation in said set being that of an animate figure having a movable member bearing a graphic symbol completing said idea, both representations in a particular set being visible simultaneously when the book is open, and means for alternatively moving said member to expose said completing symbol to view or to conceal it from view behind said figure.

11. A book having arranged upon its leaves successive sets of representations, one representation in a particular set being an incomplete idea and the other representation in said set being that of a figure having a movable member bearing a graphic symbol completing said idea, both representations in a particular set being visible simultaneously when the book is open, and means for alternatively moving said member to expose said completing symbol to view or to conceal it from view.

In testimony whereof, I have signed my name to this specification, in the presence of two subscribing witnesses.

EDNA F. BROWNING.

Witnesses:
R. C. MILLARD,
EDW. F. SULLIVAN.